United States Patent [19]

Rau et al.

[11] 4,045,198

[45] Aug. 30, 1977

[54] METHOD OF PREPARING A FOREPRODUCT FOR THE PRODUCTION OF AN OPTICAL LIGHTCONDUCTOR

[75] Inventors: Karlheinz Rau, Hanau; Albert Mühlich, Frankfurt; Fritz Simmat, Gelnhausen; Norbert Treber, Kriftel, all of Germany

[73] Assignee: Heraeus Quarzschmelze GmbH, Hanau, Germany

[21] Appl. No.: 717,075

[22] Filed: Aug. 24, 1976

[30] Foreign Application Priority Data

Aug. 28, 1975 Germany .......................... 2538313

[51] Int. Cl.$^2$ .......................... C03C 17/00; G02B 5/14
[52] U.S. Cl. .......................... 65/33; 65/3 A; 65/60 A; 65/60 D; 65/DIG. 7; 350/96 WG; 350/96 M
[58] Field of Search .......................... 65/3 A, 33, 18, 60 D, 65/60 A, 30 R, 32, 111, 157, DIG. 7; 350/96 WG, 96 M, 96 GN, 175 GN; 427/34, 423; 219/121 P, 76, 10.41

[56] References Cited

U.S. PATENT DOCUMENTS

| | | | |
|---|---|---|---|
| 3,823,995 | 7/1974 | Carpenter | 65/30 R X |
| 3,843,229 | 10/1974 | Rosenberger | 350/96 WG X |
| 3,847,585 | 11/1974 | Chisholm | 65/3 A X |
| 3,877,912 | 4/1975 | Shiraishi et al. | 350/96 WG X |
| 3,980,459 | 9/1976 | Li | 65/30 R X |
| 3,982,916 | 9/1976 | Miller | 65/60 D X |
| 4,000,416 | 12/1976 | Goell | 350/96 WG X |

OTHER PUBLICATIONS

Rigterink; "Material Systems, Fabrication and Characteristics of Glass Fiber Optical Waveguides;" Ceramic Bulletin vol. 55, No. 9 (1976); received 8/6/75 by publisher; pp. 775-780.

O'Conner et al.; "Preparation and Structural Characteristics of High Silica, Graded Index Optical Fibers; " Ceramic Bulletin vol. 55, No. 5 (1976); received 5/8/75 by publisher; pp. 513-516 and 519.

Primary Examiner—S. Leon Bashore
Assistant Examiner—Kenneth M. Schor
Attorney, Agent, or Firm—Burgess, Dinklage & Sprung

[57] ABSTRACT

There is disclosed a process for preparing a foreproduct useful in the production of an optical self-focusing lightconductor in which the index of refraction of the lightconductor diminishes with increasing distance from the conductor axis such that, when plotted against the conductor diameter, the refractive index curve is parabolic and the apex of the parabola lies over the center of the conductor diameter wherein a plurality of layers of doped silica are deposited on a cylindrical support, the layers being formed of a mixture of a vaporous silicon compound and a vaporous doping agent at elevated temperature. The invention involves depositing at least one layer of undoped silica between layers of doped silica and following each deposition of each doped or undoped silica layer by heating step in which the material is heated to a temperature of at least 900° C to vitrify the same. Each layer is deposited in a thickness ranging from 0.1 to 20 μm.

15 Claims, 3 Drawing Figures

METHOD OF PREPARING A FOREPRODUCT FOR THE PRODUCTION OF AN OPTICAL LIGHTCONDUCTOR

BACKGROUND OF THE INVENTION

Field of the Invention

This invention relates to a process for preparing a foreproduct useful in the production of an optical self-focusing lightconductor in which the refractive index of the lightconductor material decreases with increasing distance from the conductor axis such that, when plotted against the conductor diameter, the refractive index curve is parabolic and the apex of the parabola is at the center of the conductor diameter, and in which a plurality of layers of doped silica are deposited successively on a cylindrical support, especially one made of glassy material, the said layers being formed at high temperature from a mixture of a vaporous silicon compound and a vaporous doping agent.

DISCUSSION OF PRIOR ART

A process of the above-described kind is disclosed in German Auslegeschrift 2,313,204 for a doping agent which increases the refractive index of vitreous silica. After the removal of the support, the foreproduct is drawn to form a fiber-like lightconductor. For the achievement of the desired parabolic curve of the refractive index, the content of the vaporous doping agent in the mixture from which the doped silica is formed, is continuously varied. While the doping agent content is greatest in the area of the conductor axis, it decreases with increasing distance from the conductor axis. This changing of the doping agent content requires measuring and control apparatus which must assure high accuracy and repeatability within a regulating range from 0 to 100%, and which therefore are very expensive and complicated.

It is an object of this invention to provide a method for preparing a foreproduct for the production of an optical self-focusing lightconductor which will enable the foreproducts to be prepared reliably in a repetitive, simple manner and without great investment in regulating apparatuses and the like. It is a further object of this invention to prepare such a foreproduct wherein changing concentrations of doping agent and/or process parameters are not required. These and other objects of this invention will be more apparent from the following description and claims.

SUMMARY OF THE INVENTION

Broadly, this invention comtemplates an improvement in the process for preparing a product useful in the production of an optical self-focusing lightconductor in which the index of refraction of the lightconductor material decreases with increasing distance from the conductor axis such that, when plotted against the conductor diameter, the refractive index curve is parabolic and the apex of the parabola lies over the center of the conductor diameter wherein a plurality of layers of doped silica are deposited on a cylindrical support, said layers being formed of a mixture of a vaporous silicon compound and a vaporous doping agent at elevated temperature, the improvement residing in depositing at least one layer of undoped silica between layers of doped silica and following each layer with a heating step wherein the deposited silica is heated to a temperature of at least 900° C to vitrify the same, each layer being deposited in a thickness ranging from 0.1 to 20 μm.

It has been found in accordance with the present invention that a simple and reliable process is provided for the preparation of a self-focusing lightconductor having the above-described refractive index properties and parabolic curve by interrupting the deposition of doped silica on a cylindrical support with the deposition of undoped silica. It has been found that by use of both doped and undoped silica a fore-product useful in the production of an optical self-focusing lightconductor can be provided having the described parabolic curve with respect to the index of refraction.

According to whether a refractive index increasing or decreasing vaporous doping agent is added as a component to the vaporous silicon compound, the glassy layer of doped silica will have a higher or lower index of refraction than quartz glass.

The number of layers of undoped silica which are to be deposited on a layer of doped silica before another layer of doped silica is deposited increases with increasing distance from the lightconductor axis if a doping agent is used which produces an increase in the refractive index of vitreous silica. If a doping agent which produces a lowering of the index of refraction of vitreous silica is used, the situation is reversed, i.e., the number of undoped silica layers will decrease with increasing distance from the photoconductor axis. Their number and sequence can be calculated on the basis of the required parabolic curve of the refractive index of the lightconductor and on the basis of the diffusion of the ions of the doping agent in vitreous silica.

If the deposited layers of doped and undoped silica are in amorphous form, heat treatment at a temperature above 1500° C has proven to be desirable. This heat treatment will then not only produce the diffusion of the doping ions into the deposited silica, but it will also vitrify the deposited material at the same time. Since the heat treatment is performed after each deposition of a very thin layer, the effect of the diffusion of the doping ions is intensified again and again, so that an extremely uniform curve is achieved in the refractive index parabola in the lightconductor which is produced from the foreproduct prepared by the process of the invention.

As agents which reduce the index of refraction of vitreous silica, borine or fluorine containing compounds are preferred, these being employed as vaporous doping agents. Examples of such compounds include: dichlorodifluoromethane, boron-trichloride.

As agents which increase the refractive index of viterous silica, there may be employed phosphorus, germanium, aluminum, gallium or titanium compounds as vaporous doping agents. Specific examples of such compounds include: $POCl_3$, $GeCl_4$, $AlCl_3$, $GaCl_3$, $TiCl_4$.

Generally speaking, the process is conducted employing vaporous silica which is in admixture with a carrier gas. Generally speaking, the vaporous silica is present in that gas in an amount between 5 and 80 volume percent, preferably between 20 and 50 volume percent. Where a doping agent is included, the doping agent is generally present in the gas in an amount between 5 and 60, preferably between 10 and 40, weight percent based upon the weight of silica.

The gaseous silica is applied to the cylindrical support by propelling the same at a rate of between 30 and 20 rpm, preferably between 60 and 100 rpm. Thereafter, the layer is subjected to a heat treatment of at least 900° C. Preferably, the temperature is at least 1500° C and the heat treatment is carried out for a period of time of at least 20 seconds, preferably between 50 and 100 seconds.

As indicated above, the heat treatment for vitrification of each layer immediately follows the deposition of the doped or undoped silica. Preferably, no more than about 60 minutes should elapse following termination of the silica layer deposition and commencement of the heat treatment. Preferably, the heat treatment is commenced within about 2 minutes and, of course, most desirably coterminously with the cessation of the silica deposition.

In the practice of the method of the invention it has proven to be advantageous to rotate the support during the depositing of the layers of doped or undoped silica and/or during their subsequent heat treatment. Preferably the layers are deposited on the inside wall of a tubular support heated at the depositing temperature. Before the depositing of the series of layers consisting of doped and undoped silica, it is possible to produce on the inside wall of the said tubular support a layer of a vitreous material whose refractive index is just high enough for it to be usable as the jacket of an optical photoconductor whose core material is produced by the depositing of the above-mentioned series of layers, followed by the heat treatment of each layer.

By the method of the invention particularly good results have been achieved with regard to the above-mentioned parabolic curve of the refractive index if the thickness of each deposited layer of doped silica does not exceed the thickness listed below for each of the specified elements of the doping agent:

F = 13.1 $\mu$m
B = 9.2 $\mu$m
P = 7.1 $\mu$m
Ge = 4.5 $\mu$m
Al = 4.4 $\mu$m
Ga = 2.3 $\mu$m
Ti = 2.3 $\mu$m

BRIEF DESCRIPTION OF DRAWINGS

Referring to the drawings herein:

FIGS. 2 and 3 differ in that the graph shown in FIG. 2 is for one in which the process is carried out employing an agent which reduces the index of refraction of silica, whereas FIG. 3 shows a curve produced employing an agent which increases the refractive index of silica (quartz glass).

DESCRIPTION OF SPECIFIC EMBODIMENTS

Figure 1:
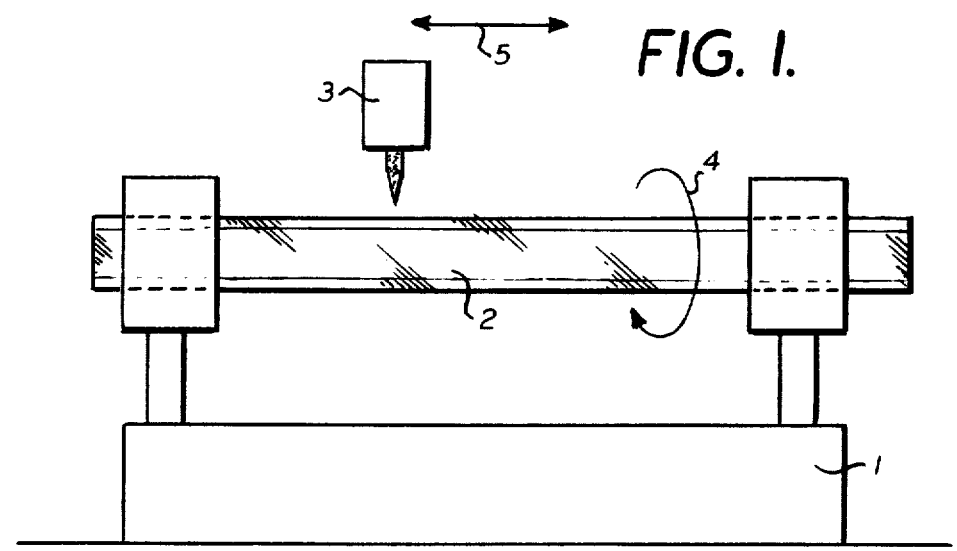
FIG. 1 is a side view diagrammatically showing an apparatus employed for carrying out the process.

Referring to the drawings herein, in a conventional glass turning machine 1 there is mounted a quartz glass tube 2 which serves as a support for the series of layers of doped and undoped silica which are to be deposited in accordance with the invention. The length of the tube is 80 mm, its outside diameter is 7 mm and its inside diameter 5 mm. A filtered oxygen stream of 350 liters per hour is passed through this tube 2 while it rotates (arrow 4) at 60 revolutions per minute. By means of the heat source 3, which is an oxygen-hydrogen burner for example, 260 mm of the length of the tube is heated to about 1450° C, the heat source being moved along this length at a speed of about 10 mm per minute (arrow 5).

After the burner has covered this length of 260 mm twice while the oxygen is flowing through the tube, the oxygen stream is shut off and instead a vaporous mixture is passed through the tube. This mixture consists of a carrier stream of oxygen gas which is passed at a rate of 50 ml/min through a silicon chloride-containing vessel which is heated at 23° C, and a stream of dichlorodifluoromethane ($CCl_2F_2$) gas which passes through tube 2 at 40 ml/min. At the same time the tube is heated by means of the burner to 1450° C, the burner passing over the 260 mm length once at a speed of 20 mm/min, whereupon the fluorine-doped silica deposits itself on the inside surface of the tube. While the burner is returning over the same length the tube temperature is increased by the burner to about 1680° C, and the supply of the one component of the mixture, namely the carrier stream of oxygen gas charged with $SiCl_4$, is interrupted. The fluorine-doped silica deposit produced upon the first pass of the burner is thereby vitrified.

In the next passage of the burner over the 260 mm length, the burner is operated such that a tube temperature of 1450° C is produced, while only the carrier stream of oxygen gas charged with $SiCl_4$ is passed through the tube. In this manner a layer of undoped silica is deposited on the vitreous, fluorine-doped silica layer. Upon the return of the burner the tube temperature is again raised to about 1680° C and a gas stream consisting of oxygen alone is passed through the tube. The undoped silica deposit is thereby vitrified and at the same time a diffusion of fluorine ions into this undoped layer is brought about. The thickness of the deposited, fluorine-doped silica layer amounts to 0.22 $\mu$m, and that of the undoped silica layer 0.2 $\mu$m.

Then the entire procedure is repeated—that is, first a fluorine-doped silica layer is deposited and vitrified, whereupon a diffusion of fluorine ions into the layer below it is simultaneously brought about. Then an undoped silica layer is deposited on the vitrified, fluorine-doped silica layer, which is then vitrified while simultaneously the diffusing action is intensified. After several repetitions of the above-described process step, the number of silica layers deposited between two fluorine-doped layers is slowly increased. By this procedure a fluorine-doped coating of such a refractive index is produced on the inside surface of quartz tube 2 that it is suitable for the production of an optical, self-focusing lightconductor.

Two examples will now be given to illustrate what sequence of layers is required for a given index of refraction.

Figure 2:
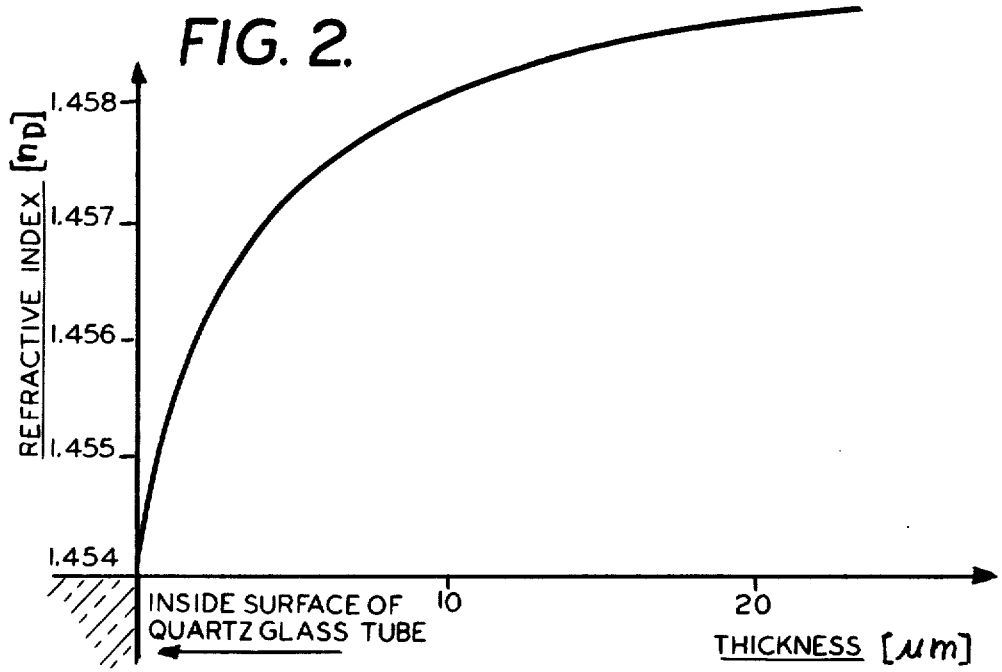
FIG. 2 is a graph showing a parabolic curve in which there is represented the refractive index plotted against the thickness of the coating to be produced.

In FIG. 2 there is represented a refractive index curve which is required in a coating to be deposited by the method of the invention, the refractive index being plotted on the ordinate and the thickness of the coating to be produced by the method of the invention being plotted on the abscissa. Dichlorodifluoromethane is added as the doping agent to reduce the index of refraction. The coating to be deposited by the method of the invention is deposited on the inside surface of a quartz glass tube whose refractive index has been reduced by the addition of refractive index-lowering ions to a value of $n_D = 1.454$. In FIG. 2, the inside surface of the above-mentioned quartz glass tube has been indicated below the axis of the abscissa on the left side of the axis of the ordinate as an aid in comprehension. The number of layers to be deposited in a coating interval is given in the following Table 1.

Table 1

| Coating interval | Number of undoped layers | Number of doped layers |
|---|---|---|
| 1 | 1 | 4 |
| 2 | 1 | 2 |
| 3 | 1 | 1 |
| 4 | 2 | 1 |
| 5 | 2 | 1 |
| 6 | 3 | 1 |
| 7 | 3 | 1 |
| 8 | 4 | 1 |
| 9 | 5 | 1 |
| 10 | 6 | 1 |
| 11 | 7 | 1 |
| 12 | 9 | 1 |
| 13 | 15 | 1 |
| 14 | 40 | 1 |

From the table it can be seen that, in the first coating interval, first an undoped layer of silica is deposited on the inside surface of the quartz glass tube, and then four fluorine-doped silica layers are successively deposited on that first undoped layer. In the second coating interval, again an undoped silica layer is first deposited on the four fluorine-doped silica layers, and two fluorine-doped silica layers are deposited on that undoped silica layer. The rest of the sequence of layers can be seen accordingly in the table. To produce the coating with the prescribed index of refraction, the deposition parameters given in conjunction with the description of FIG. 1 are to be maintained.

Figure 3:
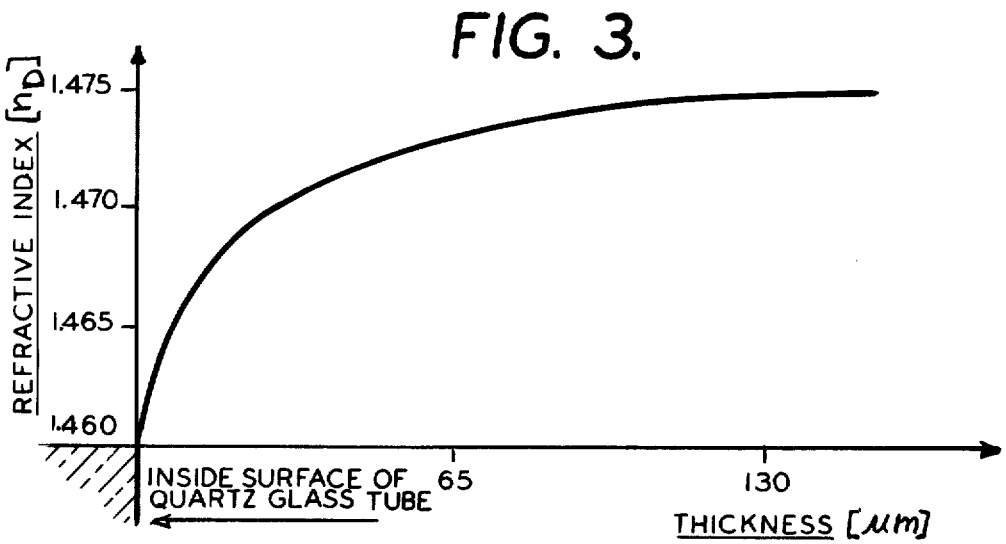
FIG. 3 is a view similar to FIG. 2 showing the same type of curve.

In FIG. 3 there is represented a prescribed curve of the refractive index in a coating to be laid down by the method of the invention, the refractive index being plotted on the ordinate and the thickness of the coating to be produced by the method of the invention being plotted on the abscissa. The doping agent, in contrast to the one involved in FIG. 2, is now a compound which increases the index of refraction, namely germanium chloride, so that an increase in the refractive index will be accomplished by the incorporation of germanium ions. The coating to be deposited by the method of the invention will be laid down on the inside surface of a quartz glass tube whose refractive index is 1.458. For ease in comprehension, the inside surface of the quartz glass tube is represented by shading on the left side of the axis of ordinate below the axis of abscissa. The number of layers to be deposited per depositing interval is given in the following Table 2.

Table 2

| Coating interval | Number of doped layers | Number of undoped layers |
|---|---|---|
| 1 | 1 | 4 |
| 2 | 1 | 2 |
| 3 | 1 | 1 |
| 4 | 2 | 1 |
| 5 | 2 | 1 |
| 6 | 3 | 1 |
| 7 | 3 | 1 |
| 8 | 3 | 1 |
| 9 | 4 | 1 |
| 10 | 4 | 1 |
| 11 | 5 | 1 |
| 12 | 6 | 1 |
| 13 | 8 | 1 |
| 14 | 11 | 1 |
| 15 | 21 | 1 |
| 16 | 31 | 0 |

From Table 2 it is apparent that, in the first coating interval, a germanium-doped silica layer is first deposited on the inside surface of the quartz glass tube, and on this layer four undoped silica layers are deposited. In the second coating interval, another germanium-doped silica layer is then deposited on the four undoped silica layers, and on that two undoped silica layers are deposited. The rest of the sequence can be seen accordingly in the Table. The following conditions were used as the basis for the depositing of the doped and undoped layers:

An oxygen gas stream is passed at a rate of 75 ml/min through a silicon tetrachloride containing vessel which is thermostatically controlled at a temperature slightly above room temperature. The vaporous silicon tetrachloride-oxygen mixture thus produced is fed into a quartz glass tube heated at about 1630° C, on whose inside surface silica then deposits itself. During the depositing process the quartz glass tube was rotated; its speed of rotation was 200 rpm. To produce the doped silica layer, a gas stream was introduced into the revolving quartz glass tube in addition to the vaporous silicon tetrachloride-oxygen mixture, which consisted of a mixture of germanium tetrachloride and oxygen. This mixture was produced by passing an oxygen stream through a vessel containing germanium tetrachloride and thermostatically controlled like the vessel containing the silicon tetrachloride, at a rate of flow of 50 ml/min. The speed of movement of the heating source during the depositing process was 5 mm/min.

What is claimed is:

1. In a process for preparing a foreproduct useful in the production of an optical, self-focusing lightconductor in which the index of refraction of the lightconductor material diminishes with increasing distance from the conductor axis such that, when plotted against the conductor diameter, the refractive index curve is parabolic and the apex of the parabola lies over the center of the conductor diameter wherein a plurality of layers of doped silica are deposited on a cylindrical support, said layers being formed of a mixture of a vaporous silicon compound and a vaporous doping agent at elevated temperature, the improvement which comprises depositing at least one layer of undoped silica between layers of doped silica and following each deposition of each doped or undoped silica layer heating the deposited silica to a temperature of at least 900° C to vitrify the same, each layer being deposited in a thickness ranging from 0.1 to 20 $\mu$m, such that the number of layers of undoped silica which are to be deposited on a layer of doped silica before another layer of doped silica is deposited increases with increasing distance from the lightconductor axis if a doping agent is used which produces an increase in the refractive index of vitreous silica and decreases with increasing distance from the lightconductor axis if a doping agent is used which produces a decrease in the refractive index of vitreous silica.

2. A process as claimed in claim 1 wherein initially upon said cylindrical support there is deposited a layer of undoped silica.

3. A process as claimed in claim 1 wherein said cylindrical support is one of a vitreous material.

4. A process as claimed in claim 1 wherein following the deposition of each doped or undoped layer the deposited material is heated to a vitrifying temperature within 3600 seconds following the deposition.

5. A process as claimed in claim 1 wherein the composition of the doped silica layer is maintained constant for all doped layers.

6. A process as claimed in claim 1 wherein the deposition conditions are maintained constant from the deposition of one layer of doped silica through the deposition of a layer of undoped silica to the deposition of another layer of doped silica.

7. A process as claimed in claim 1 wherein the layers are deposited on the inside wall of a tubular support maintained at the depositing temperature.

8. A process as claimed in claim 7 wherein said tubular support is rotated during deposition of the silica layers or during the heat treatment at over 900° C.

9. A process as claimed in claim 4 wherein the heat treatment of the deposited silica layers following deposition is effected at a temperature above 1500° C.

10. A process as claimed in claim 7 wherein on the inside wall of the tubular support, prior to the depositing of the series of layers consisting of doped and undoped silica, a layer of vitreous material is deposited whose refractive index is only high enough for it to be usable as the jacket of an optical photoconductor where core material is produced by the deposition of a sequence of layers followed by heat treatment.

11. A process as claimed in claim 10 wherein at least one layer of doped silica in its vitreous state has a refractive index greater or less than quartz glass.

12. A process as claimed in claim 10 wherein the doped silica layer is doped with an agent which reduces the refractive index.

13. A process as claimed in claim 12 wherein said agent is a boron or fluorine compound.

14. A process as claimed in claim 1 wherein the doped silica layer is doped with an agent which increases the refractive index.

15. A process as claimed in claim 14 wherein said agent is a phosphorus, germanium, aluminum, gallium or titanium compound.

* * * * *